United States Patent [19]

Bucksch

[11] Patent Number: 4,833,943

[45] Date of Patent: May 30, 1989

[54] TRANSMISSION FOR A MOTOR VEHICLE

[75] Inventor: Manfred Bucksch, Friedrichshafen, Fed. Rep. of Germany

[73] Assignee: Zahnradfabrik Friedrichshafen AG, Friedrichshafen, Fed. Rep. of Germany

[21] Appl. No.: 19,380

[22] PCT Filed: May 16, 1986

[86] PCT No.: PCT/EP86/00292

§ 371 Date: Jan. 21, 1987

§ 102(e) Date: Jan. 21, 1987

[87] PCT Pub. No.: WO86/07425

PCT Pub. Date: Dec. 18, 1986

[30] Foreign Application Priority Data

Jun. 15, 1985 [EP] European Pat. Off. .......... PCT/EP85/00292

[51] Int. Cl.$^4$ .......... F16H 37/08; F16H 1/42
[52] U.S. Cl. .......... 74/701; 74/695; 74/714; 74/740
[58] Field of Search .......... 74/740, 695, 701, 714, 74/781 R, 782, 783

[56] References Cited

U.S. PATENT DOCUMENTS

| | | | |
|---|---|---|---|
| 3,797,332 | 3/1974 | Cameron et al. | 74/781 R X |
| 4,056,986 | 11/1977 | Hobbs | 74/695 X |
| 4,417,642 | 11/1983 | Suzuki et al. | 74/740 X |
| 4,537,092 | 8/1985 | Morisawa | 74/695 |
| 4,548,099 | 10/1985 | Wayman et al. | 74/701 X |
| 4,589,304 | 5/1986 | Ashikawa et al. | 74/701 |
| 4,594,914 | 6/1986 | Kubo et al. | 74/695 X |
| 4,612,824 | 9/1986 | Rühle | 74/714 |
| 4,624,154 | 11/1986 | Kraft et al. | 74/695 |
| 4,676,123 | 6/1987 | Kubo et al. | 74/695 |
| 4,763,543 | 8/1988 | Harada et al. | 74/740 |
| 4,779,699 | 10/1988 | Hatano | 74/695 X |

FOREIGN PATENT DOCUMENTS

| | | |
|---|---|---|
| 2919405 | 12/1979 | Fed. Rep. of Germany . |
| 2919167 | 6/1986 | Fed. Rep. of Germany . |
| 0150643 | 11/1981 | Japan .......... 74/695 |
| 0173641 | 10/1982 | Japan .......... 74/695 |
| 0190152 | 11/1982 | Japan .......... 74/695 |
| 0166749 | 9/1984 | Japan .......... 74/695 |
| 2035930 | 6/1980 | United Kingdom . |
| 2076083 | 11/1981 | United Kingdom . |

OTHER PUBLICATIONS

F43/301/RT 3356-683, ZF-Automatgetriebe 3 HP 22.
F43/437 RT 3397-683, ZF-Automatgetriebe, 4HP 14 4HP 18.
F1/36 WH 816009, (page 3).

*Primary Examiner*—Dirk Wright
*Assistant Examiner*—Harold E. Macris
*Attorney, Agent, or Firm*—Herbert Dubno

[57] ABSTRACT

A transmission for a motor vehicle with a drive motor (3) is arrayed transversely to the direction of motion with an automatic speed change transmission (1) flange-mounted coaxially, where between drive motor (3) and the speed change transmission (1) there is preferably provided a hydrodynamic unit (2), e.g. a hydrodynamic torque converter (20), the transmission having an axle drive (4) which is driven via a countershaft (5) and constant pairs of spur gears (51, 52, 53, 54, 55). For the attainment of at least one further speed a shiftable partial transmission (6) is additionally arrayed coaxially with the axle drive (4) and connected thereto.

6 Claims, 3 Drawing Sheets

0
TRANSMISSION FOR A MOTOR VEHICLE

FIELD OF THE INVENTION

This invention concerns a transmission for a motor vehicle.

BACKGROUND OF THE INVENTION

For the attainment of the maximum possible available space in small passenger motor vehicles, the drive motors are arrayed transversely to the direction of motion, and provided in connection with a front wheel drive. This configuration just barely manages to accommodate the drive motor and a multi-speed automatic transmission flanged thereonto, with three or at most four speeds, depending on the torque to be transmitted. Unfortunately, the space transverse to the direction of motion under this configuration is taken up to such an extent that at full steering excursion, and with snow chains installed, the chains already impinge on the transmission so that a further increase of the number of speeds does not appear to be possible.

Such transmission is known from company publication F1/36 WH 816009 (page 3) and also as represented in bulletin sheets F43/301/RT 3356-683 and F 43/437 RT 3397-683. A similar disclosure is found in DE-OS No. 29 19 167 and DE-OS No. 29 19 405.

For small passenger motor vehicles it is highly important to lower the fuel consumption by better adaptation of the drive train to the more fuel efficient portion of the drive motor performance curve.

It is therefore an objective of the invention to further develop a transmission for a motor vehicle by increasing the number of speeds with the goal of adapting the drive train better to the drive motor, without having to enlarge the available installation space. Achievement of this objective will mean cost savings in development and manufacture.

SUMMARY OF THE INVENTION

A transmission for a motor vehicle with a drive motor is disclosed wherein a first axis traverses a length of the motor, which length is arranged transversely to the direction of the vehicle motion, and comprises:
- an automatic transmission coaxial with the first axis,
- a hydrodynamic torque converter positioned between the automatic transmission and the motor;
- a countershaft arrayed on a second axis parallel to the first axis;
- an axle drive mounted along a third axis parallel to the second axis actuated by the countershaft;
- a first and second set of spur gears separated from one another and transversely connected to the countershaft; and
- a partial transmission communicating with the automatic transmission to deliver at least one more speed, the partial transmission being placed coaxially along the third axis and connected to the axle drive.

If an automatic transmission as generally known, and arranged in known manner, is extended by a partial transmission which is arranged coaxially to the axle drive and is connected therewith, then at least one additional speed can be gained with relatively simple means because no changes need to be made to the already existing transmission. A small installation space parallel to the drive motor is already normally available and may be utilized by the partial transmission. Use of this space will allow retention of the known arrangement of drive motor and speed change transmission and even of the axle drive. Only the axle drive has to be adapted to the new partial transmission, which requires relatively little effort, considering the success achieved.

Where the partial transmission is applied as a simple planet gear set with the clutches and brakes necessary for shifting, and with a free wheel unit, and the axle drive is implemented as a planet gear differential, the combination of these two drives is possible in a particularly simple manner. The transmission housing can be adapted appropriately on one hand by an entirely new housing, or, on the other hand, by means of extending the housing which in principle already exists with a housing for the axle drive and the partial transmission. The particular option chosen will depend on the quantity of transmissions to be fabricated.

By means of simple connections but driven differentially, between the axle drive and the partial transmission, a five-speed transmission with one or two overdrives can be achieved in connection with a four-speed transmission in the hitherto known arrangement. Thereby the usual countershaft arrangement of the known four-speed transmission can be eliminated, which is of particular advantage.

BRIEF DESCRIPTION OF THE DRAWINGS

Further details of the invention are explained hereinafter through the description and drawings of various embodiments. The drawings include the following figures.

DETAILED DESCRIPTION

Figure 1:
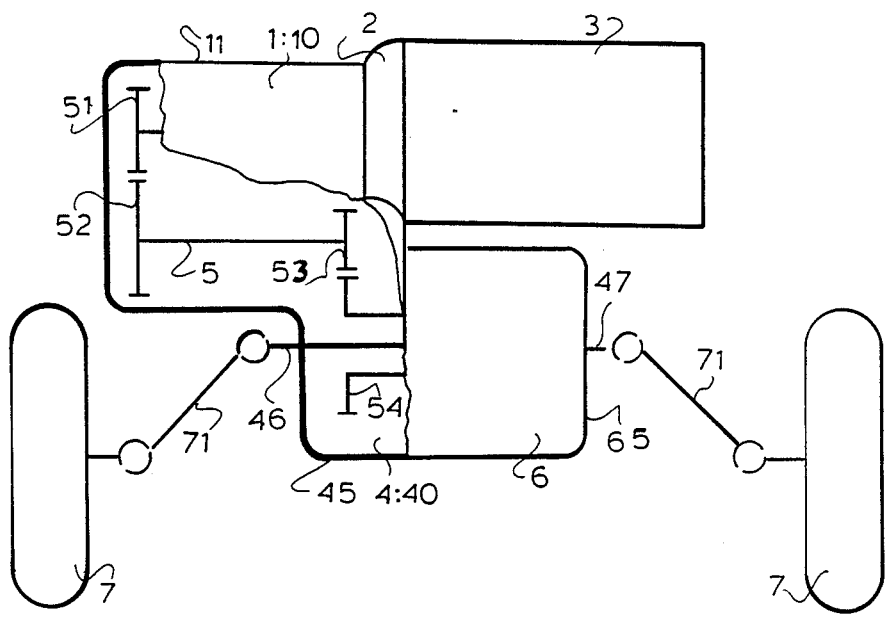
FIG. 1 is a schematic representation of the drive axle connected with the drive motor and transmission.

In FIG. 1, the speed change transmission is designated by 1, a hydrodynamic torque converter by 2, and the drive motor by 3. The positive connection to the axle drive 4 occurs via spur gears 51, 52, the countershaft 5, and the spur gears 53 and 54. The partial transmission 6, arrayed parallel to the drive motor 3, is connected to the former axle drive 4. Drive wheels 7 are driven from axle drive 4 via the drive shafts 71. The housing of the speed change transmission is designated 11, the housing section nearest the axle drive with 45, and the housing section nearest the partial transmission with 65. Together sections 45 and 65 form a common housing.

Figures 2, 3:
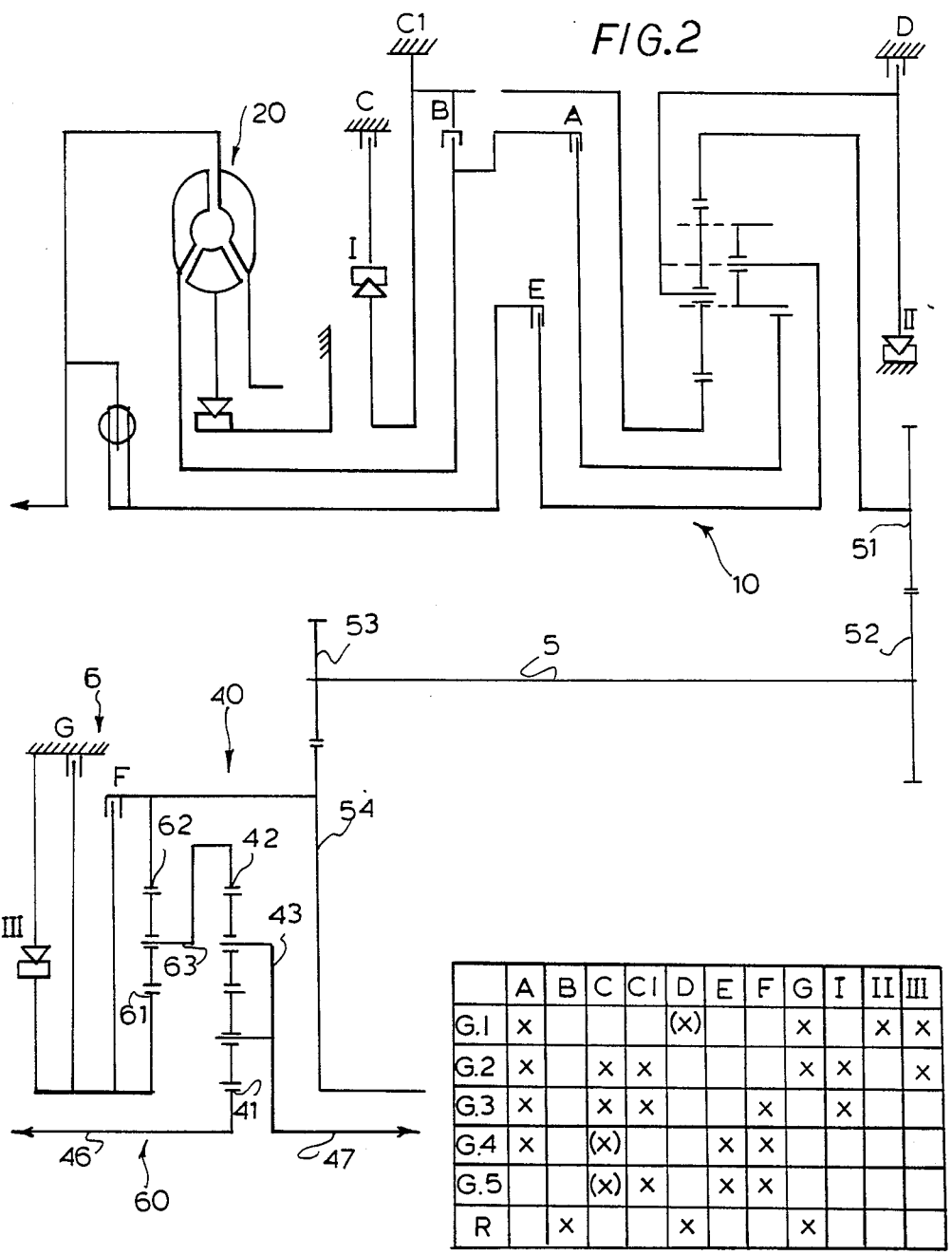
FIG. 2 is a transmission construction in schematic representation.
FIG. 3 is a schematic of clutches and brakes shifted depending on speeds according to FIG. 2.

In the schematic drive arrangement of FIG. 2, a four-speed automatic transmission 10, known as such, is complemented in a known manner by a hydrodynamic torque converter 20. The countershaft 5 with the spur gear sets 51, 52 and 53, 54 serves as drive for a planetary differential, e.g. in a transversely mounted drive motor in a front wheel drive vehicle. Spur gear 54 is connected to ring gear 62 of a simple planetary gear set 60 and to a shift coupling F of the partial transmission 6. Sun gear 61 has a solid connection to free-wheel unit III, which is supported in the housing, as well as with a brake G and additionally with another friction element of clutch F. Arm 63 of the simple planet gear set 60 of partial transmission 6 is connected to the internal gear 42 of the planetary differential 40, and the power output occurs on the one hand via sun gesar 41 of the output shaft 46, and on the other hand via arm 43 of the two meshing planets towards output shaft 47, where the two output shafts 46 and 47 are linked to the drive shafts 71 (FIG. 1) for the drive wheels 7. By means of the connection of the spur gear 54 with the simple planet gear set 60 and the axle differential 40, the four-speed main transmission is expanded into a five-speed transmission with three speeds into lower ranges, one direct-drive speed, and one overdrive. FIG. 3 calculates for a better understanding the relationship of the engaged clutches and brakes and active free wheel units in the various speeds.

Figures 4, 5:
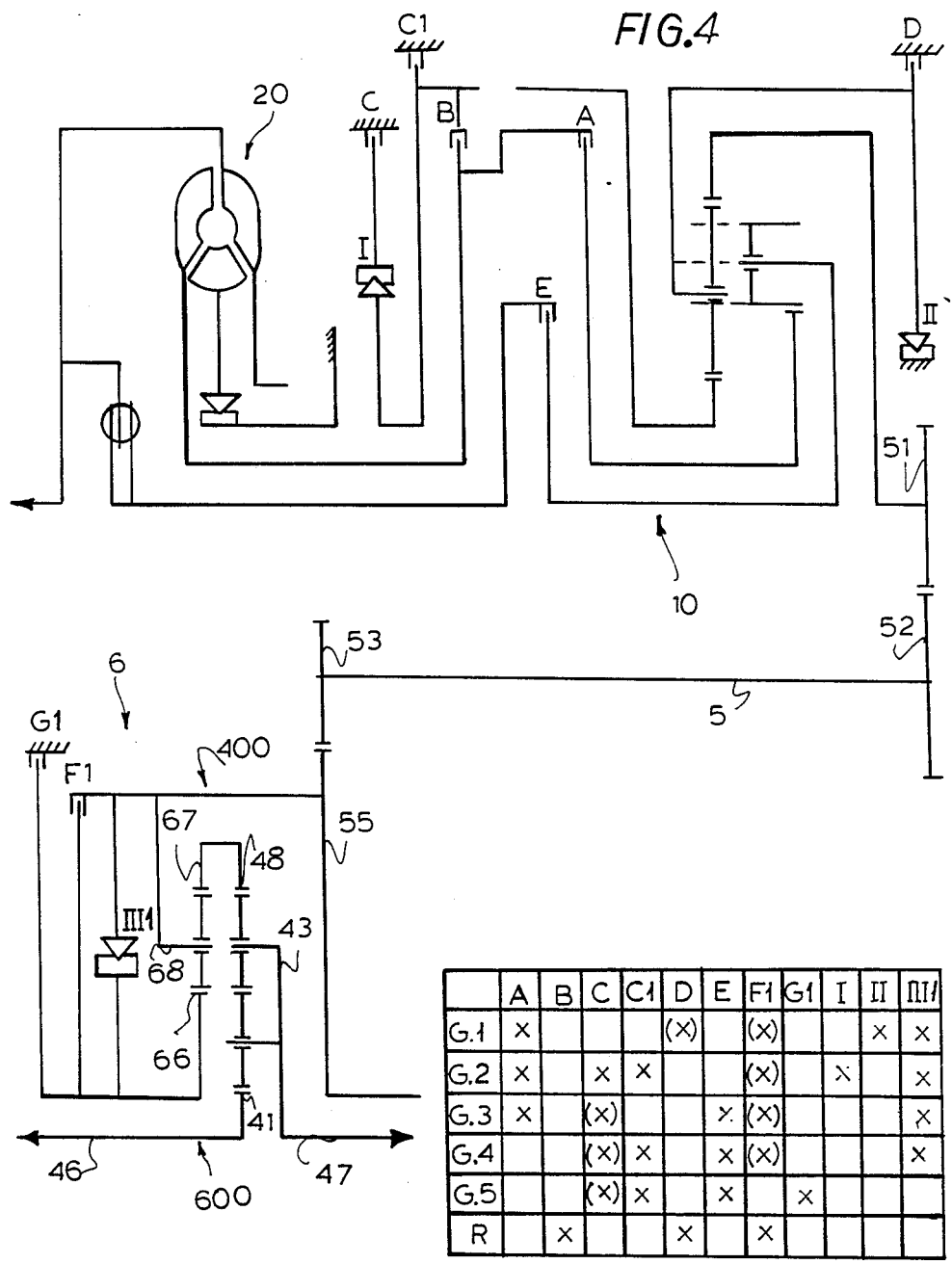
FIG. 4 is a transmission construction according to FIG. 2, but in a second embodiment.
FIG. 5 is a schematic according to FIG. 3, but coordinated to FIG. 4.

The drive schematic shown in FIG. 4 is in principle similar to FIG. 2, but here only the spur gear 55 of the second spur gear set 53/55 is connected to arm 68 of the simple planet gear set, a free-wheel unit III1 and the clutch F1. Sun gear 66 of the simple planet gear set 600 is driveably connected to free-wheel unit III1, to clutch F1 and to brake G1. The power output from partial transmission 6 to the planetary differential is delivered to ring gear 48 via ring gear 67, whereby the two ring gears can be made of a single piece. By means of this positive drive connection, deviating from FIG. 2, between the spur gear 55, the simple planet gear set 600 and the axle differential 400, two speeds are obtained into lower ranges, i.e. one direct drive and two overdrives. FIG. 5 shows, in a format according to FIG. 3, the engaged clutches and brakes as well as the effective free-wheel units in the several speeds per the layout of FIG. 4.

Naturally in place of the four-speed transmission 10 in FIGS. 2 and 4, all other known and possible three- and four-speed transmissions can be provided as main transmission 10, where in every case an additional speed is gained by means of partial transmission 6.

I claim:

1. A transmission for a motor vehicle with a drive motor wherein a first axis traverses a length of said motor, which length is arranged perpendicular to the direction of the vehicle motion, comprising:
    an automatic transmission coaxial with said first axis;
    a hydrodynamic torque converter positioned between said automatic transmission and said motor;
    a countershaft arrayed on a second axis parallel to said first axis;
    an axle drive comprising a planetary differential mounted along a third axis parallel to said second axis actuated by said countershaft;
    a first and second set of spur gears separated from one another and transversely connected to said countershaft;
    a partial transmission comprising a simple planetary gear set communicating with said automatic transmission to deliver at least one more speed, said partial transmission being placed coaxially along said third axis and connected to said axle drive; and
    a further spur gear driven by the countershaft;
    a ring gear which is a part of said simple planetary gear set;
    a clutch;
    a sun gear;
    a brake;
    a free-wheel unit supported by a housing;
    a planet carrier and a planetary ring gear which is part of said differential;
    a first and second output shaft;
    a pair of drive wheels;
    two meshing planets of said planetary differential having a meshing sun gear and an arm; and
    wherein said automatic transmission has four speeds and that for the attainment of an additional speed in said partial transmission said further spur gear is connected with the ring gear of said single planetary gear set and with said clutch, the sun gear with said clutch, and said brake as well as said freewheel unit are supported by the housing and the planet carrier with said ring gear of said differential and that said first and second output shafts are connected to the drive wheels by means of said sun gear and said arm of the two meshing planets and that thus there is obtained in addition to a reverse gear, altogether three speeds in the low range, one direct drive and one overdrive.

2. A transmission according to claim 1 wherein said axle drive, partial transmission, hydrodynamic torque converter, and automatic transmission are emplaced within a common transmission housing.

3. A transmission according to claim 1 wherein the axle drive and the partial transmission are emplaced in a common housing, said housing have one or more flanges by which said housing is mounted onto said automatic transmission.

4. A transmission according to claim 1 wherein the partial transmission is emplaced in a partial housing, said partial housing having one or more flanges through which the partial transmission is mounted onto a transmission housing covering the automatic transmission, the hydrodynamic torque converter, and the countershaft.

5. A transmission for a motor vehicle with a drive motor wherein a first axis traverses a length of said motor, which length is arranged perpendicular to the direction of the vehicle motion, comprising:
    an automatic transmission coaxial with said first axis;
    a hydrodynamic torque converter positioned between said automatic transmission and said motor;
    a countershaft arrayed on a second axis parallel to said first axis;
    an axle drive comprising a planetary differential mounted along a third axis parallel to said second axis actuated by said countershaft;
    a first and second set of spur gears separated from one another and transversely connected to said countershaft;
    a partial transmission comprising a simple planetary gear set communicating with said automatic transmission to deliver at least one more speed, said partial transmission being placed coaxially along said third axis and connected to said axle drive; and
    a further spur gear driven by the countershaft;
    an arm and a first ring gear comprising a part of said simple planetary gear set;
    a clutch;
    a free-wheel unit;
    a sun gear;
    a brake;
    a second ring gear of said planetary differential;
    a first and second output shaft;
    a pair of drive wheels;
    two meshing planets of said planetary differential having a meshing sun gear and an arm; and wherein said automatic transmission has four-speeds and that for the attainment of an additional speed in said partial transmission there is located said further spur gear connected to said arm of said simple planetary gear set as well as to said clutch and said free-wheel unit, said sun gear being connected with said clutch, said free-wheel unit, and said brake, and that the first ring gear is connected with the second ring gear of the planetary differential, and that said two output shafts are connected to said drive wheels via the sun gear and arm of said two meshing planets of the planetary differential, and through this arrangement obtaining in addition to a reverse gear, altogether two speeds in the low range one direct speed and two overdrives.

6. A transmission according to claim 5 wherein said ring gears of the simple planetary gear set and the planetary differential are constructed as a single piece.

* * * * *